United States Patent [19]

McCullough

[11] Patent Number: 5,065,024

[45] Date of Patent: Nov. 12, 1991

[54] INFRARED IMAGING SYSTEM WITH SIMULTANEOUSLY VARIABLE FIELD OF VIEW AND RESOLUTION AND FIXED OPTICAL MAGNIFICATION

[75] Inventor: John McCullough, Marlborough, Mass.

[73] Assignee: Inframetrics, Inc., Billerica, Mass.

[21] Appl. No.: 476,821

[22] Filed: Feb. 7, 1990

[51] Int. Cl.⁵ .............................. G01J 3/02; G01J 5/08
[52] U.S. Cl. ..................................... 250/334; 250/330; 250/349; 250/353
[58] Field of Search ............... 250/330, 332, 334, 342, 250/349, 353

[56] References Cited

U.S. PATENT DOCUMENTS

| | | | |
|---|---|---|---|
| 3,622,788 | 11/1971 | Briggs | 250/347 |
| 3,700,905 | 10/1972 | Parkin et al. | 250/349 X |
| 3,781,558 | 12/1973 | Anderson | 250/332 |
| 4,112,300 | 9/1978 | Hall, Jr. et al. | 250/330 |
| 4,347,530 | 8/1982 | Stetson | 358/113 |
| 4,358,789 | 11/1982 | Confer | 358/140 |
| 4,719,350 | 1/1988 | Alm | 250/330 |
| 4,858,442 | 8/1989 | Stetson | 62/6 |
| 4,864,136 | 9/1989 | Behlke | 250/338.3 |

FOREIGN PATENT DOCUMENTS

| | | |
|---|---|---|
| 0050970 | 10/1981 | European Pat. Off. . |
| 0082406 | 12/1982 | European Pat. Off. . |
| 2900882 | 7/1980 | Fed. Rep. of Germany ...... 250/342 |
| 8700639 | 1/1987 | World Int. Prop. O. .......... 250/334 |

OTHER PUBLICATIONS

Inframetrics product brochure, "Model IRTV-445L Loris Long Range Infrared System", 16 Esquire Road, No. Billerica MA 01862-2598, Jul. 1989.
Lettington, A. H., "Infra-Red Scanning Techniques", *Military Microwave "82, Conference Proceedings*, 10/22/82, pp. 123-127.
Inframerics brochure "IRS-IR Imaging System", Sep. 1989.

*Primary Examiner*—Constantine Hannaher
*Assistant Examiner*—Jacob M. Eisenberg
*Attorney, Agent, or Firm*—Cesari & McKenna

[57] ABSTRACT

An infrared imaging system including a fixed magnification telescope, a two-axis variable angle scanner, a plurality of differently-sized infrared detectors positioned in the focal plane of the scanner, a selector to choose an output signal provided by one of the detectors, and a raster scan display. A single detector is associated with a particular desired field of view, with the size of the detector chosen to provide the desired resolution. To decrease the field of view encompassed by the imaging system, and thereby magnify the scene presented on the display, a smaller scan angle and a smaller detector are simultaneously selected. A gain and bandwidth normalization circuit is optionally used to normalize the electrical signals output by the various detectors. This arrangement allows reducing the field of view with a simultaneous change in the instantaneous field of view, so that resolution of a picture in the display accordingly increases. An object in focus in the display also remains in focus when th field of view is changed, so that the observer does not lose track of objects which must be followed closely. The system is small, mechanically simple, lightweight, and rugged, and can be packaged in a housing having approximately the same size and weight as a set of optical field binoculars.

4 Claims, 4 Drawing Sheets

INFRARED IMAGING SYSTEM WITH SIMULTANEOUSLY VARIABLE FIELD OF VIEW AND RESOLUTION AND FIXED OPTICAL MAGNIFICATION

FIELD OF THE INVENTION

This invention relates generally to infrared imaging systems and more specifically to a small, lightweight imager in which the field of view and resolution are varied simultaneously.

BACKGROUND OF THE INVENTION

Infrared cameras are used increasingly in a variety of operations such as law enforcement, facilities security, search and rescue, and national defense. Such applications all require detecting the presence of human beings, vehicles, and other objects in low-light situations where conventional binoculars or video cameras are otherwise impossible to use.

To provide compatibility with standard television-type raster scan displays, such cameras typically include a two-dimensional imaging system for receiving radiant energy. The imaging system usually includes a scanner, which is a device containing a number of reflectors to direct radiant energy from successive elemental areas of an input field of view to one or more radiant energy detectors. Although a single, gimballed reflector might be used to scan the desired field of view, two orthogonal reflectors are generally used, with each reflector being separately driven about a single axis.

For serial scanning one or both of the reflectors may be oscillated about an axis; or one axis may be scanned by using mechanisms such as a multifaceted polygonal mirror, sawtooth reflective wheel, or internally reflective carousel mounted on a high revolution-per-minute (RPM) motor.

However, there are several advantages to using a two-axis oscillating, or raster-scanning reflector arrangement as disclosed in U.S. Pat. No. 4,347,530 issued to Stetson on Aug. 31, 1982, and assigned to Inframetrics, Inc., the assignee of the present invention, the contents of which are hereby incorporated by reference. The technique described therein is to provide orthogonally-mounted horizontal and vertical reflectors, with each arranged to oscillate sinusoidally about a single axis. By using this technique, the mechanical complexity of high speed rotating assemblies is avoided, and the resulting mechanism is very light-weight and insensitive to shock and vibration. In addition, a high scan efficiency can be achieved, so that almost the entire scanned object field is available for presentation to the display.

Nonetheless, present imaging systems are not without their problems. Consider how a typical observer uses such a system. He or she first sets a desired field of view to be fairly wide, in order to detect activity in as large an object scene as possible. Upon noting an object of interest, the desired field of view will be narrower. In other words, the observer wishes to see the object with greater magnification, or otherwise cause objects of interest to appear larger in display.

With a two-axis scanner the field of view can be reduced almost instantaneously, by simply limiting the angle through which each of the reflectors travels while maintaining constant scanning frequency. This is not always convenient or aesthetic with a rotating multifaceted polygonal mirror arrangement, wherein the speed of rotation and thus the scanning frequency must be changed in order to change the resulting field of view. In particular, the momentum of the rotating mirror must also dissipate, and since this may take a minute or even longer to occur, the magnified image is clearly visible only after a waiting period.

However, two-axis scanners are also not without their drawbacks. Although the field of view can be changed almost instantaneously, the result is a picture in which the resolution has not changed. In other words, a magnified presentation of the object scene is provided to the display, but one in which the instantaneous field of view has not changed. Thus, elemental areas of the scene, or pixels, in the display appear to grow, and resolution is apparently lost, or at least, a high resolution display is not available.

A variable magnification optical telescope positioned at the input to the scanner can also be used to change the field of view. These typically require a mechanism of some sort to switch various magnifying lenses in and out of the input optical path to the scanner. However, this not only adds mechanical complexity to the entire system, but also results in further problems. In particular, the focal length of the systems different optical elements is then different with different fields of view. Thus, an object scene completely in-focus for one field of view will not necessarily be in focus for a different field of view. This then requires refocusing, or elaborate servomechanisms to compensate for the difference in focal length. The result is either difficulty in manually tracking objects, or an additional, expensive servomechanism.

What is needed is an imaging system which allows reducing the field of view with a simultaneous change in the instantaneous field of view, so that resolution of a magnified display increases accordingly.

In addition, an object in focus should also remain in focus when the field of view is changed, so that the observer does not lose track of objects which must be followed closely.

The system should be small, mechanically simple, easy to use, lightweight, and rugged, much as a set of optical binoculars, so that it can be carried about easily, and otherwise used in the field.

In the prior art, such as in U.S. Pat. No. 4,347,530 previously mentioned, two or more detectors were placed in the focal plane of the scanner so that two lines of the object scene could be scanned at a given time, or so that an improved detector signal to noise ratio could be obtained. However, there is no teaching or suggestion in the prior art that multiple detectors can be used to change the instantaneous field of view, or to provide a scanning system in which the required focus is not affected by changes in temperature or the desired field of view.

SUMMARY OF THE INVENTION

Briefly, an infrared imaging system constructed in accordance with the invention includes a fixed magnification telescope, a two-axis variable-scan width and height scanner, a plurality of differently-sized infrared detectors positioned in the focal plane of the scanner, a selector to choose an output signal provided by one of the detectors, and a raster scan display. A single detector is associated with a particular desired field of view, with the size of the detector chosen to provide the desired resolution. To decrease the field of view provided by the imaging system, and thereby magnify the scene presented on the display, a smaller scan width and height are selected for the scanner, and a smaller detector is selected to drive the display.

Optionally, a gain and bandwidth normalization circuit is used to normalize the electrical signals put out by the various detectors.

A position feedback signal provided by the telescope enables presentation of a temperature-invariant indication of the focal range of the imaging system.

This arrangement allows reducing the field of view with a simultaneous change in the instantaneous field of view, so that the resolution of a displayed picture increases accordingly.

An object in focus in the display also remains in focus when the field of view is changed, so that the observer does not loose track of objects which must be followed closely.

The system is small, mechanically simple, lightweight, and rugged, and can be packaged in a housing having approximately the same size and weight as a set of optical field binoculars.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
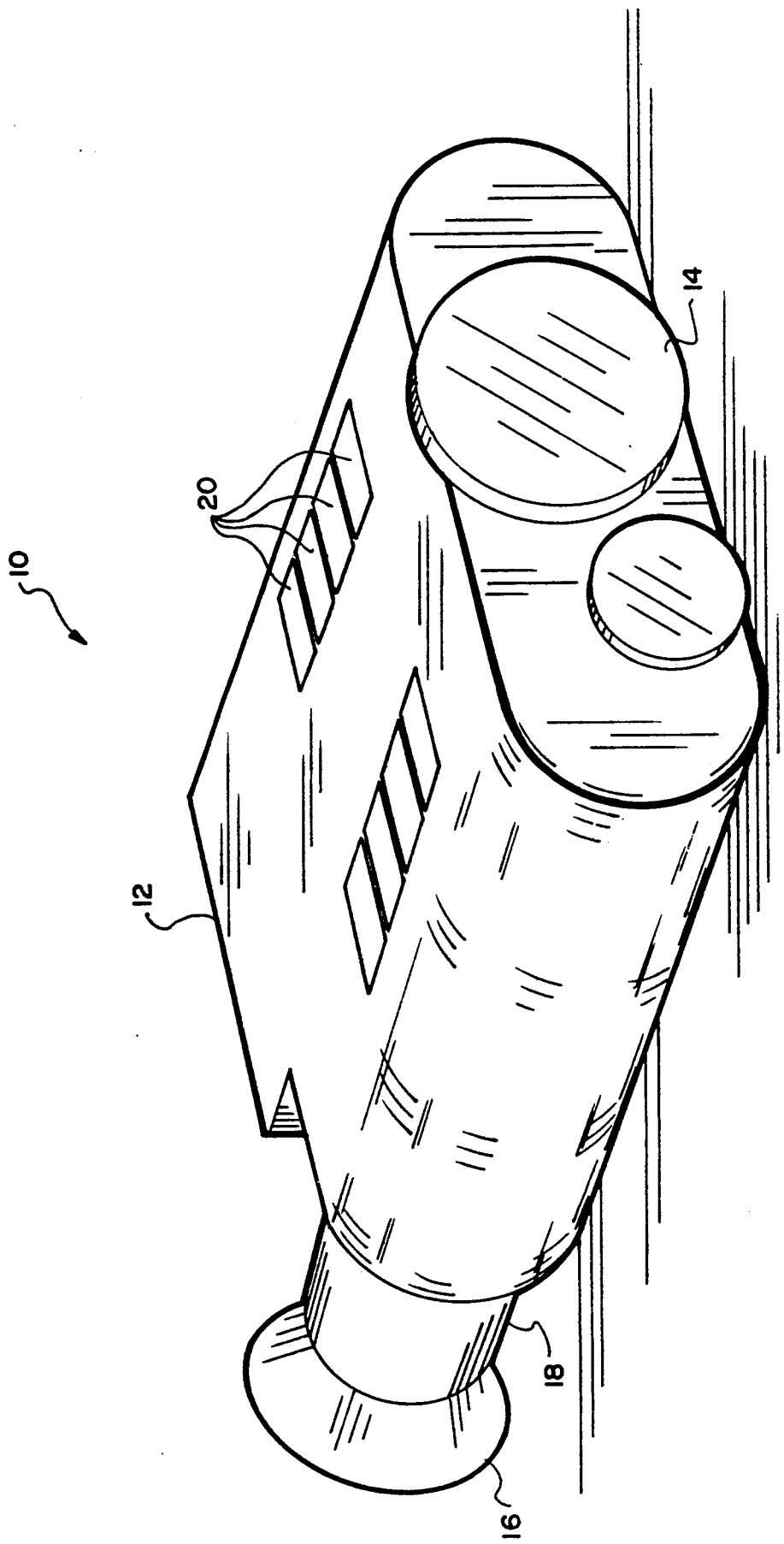
FIG. 1 is an isometric view of the exterior of the imaging system.

FIG. 1 is an exterior view of a miniature infrared imaging system 10 constructed in accordance with the invention. The components of imaging system 10 are completely enclosed within a housing 12 formed of a suitable lightweight and strong material such as thermal plastic. Visible from the exterior of imaging system 10 are the outer aperture of a telescope 14, an eyepiece 16, a miniature cathode ray tube display 18 and a number of buttons 20 positioned on the exterior of the housing 12 adjacent where the user grasps the housing 12. Imaging system 10 is fairly small and lightweight; it is approximately the same size and weight as a standard optical field binocular.

Figure 2:
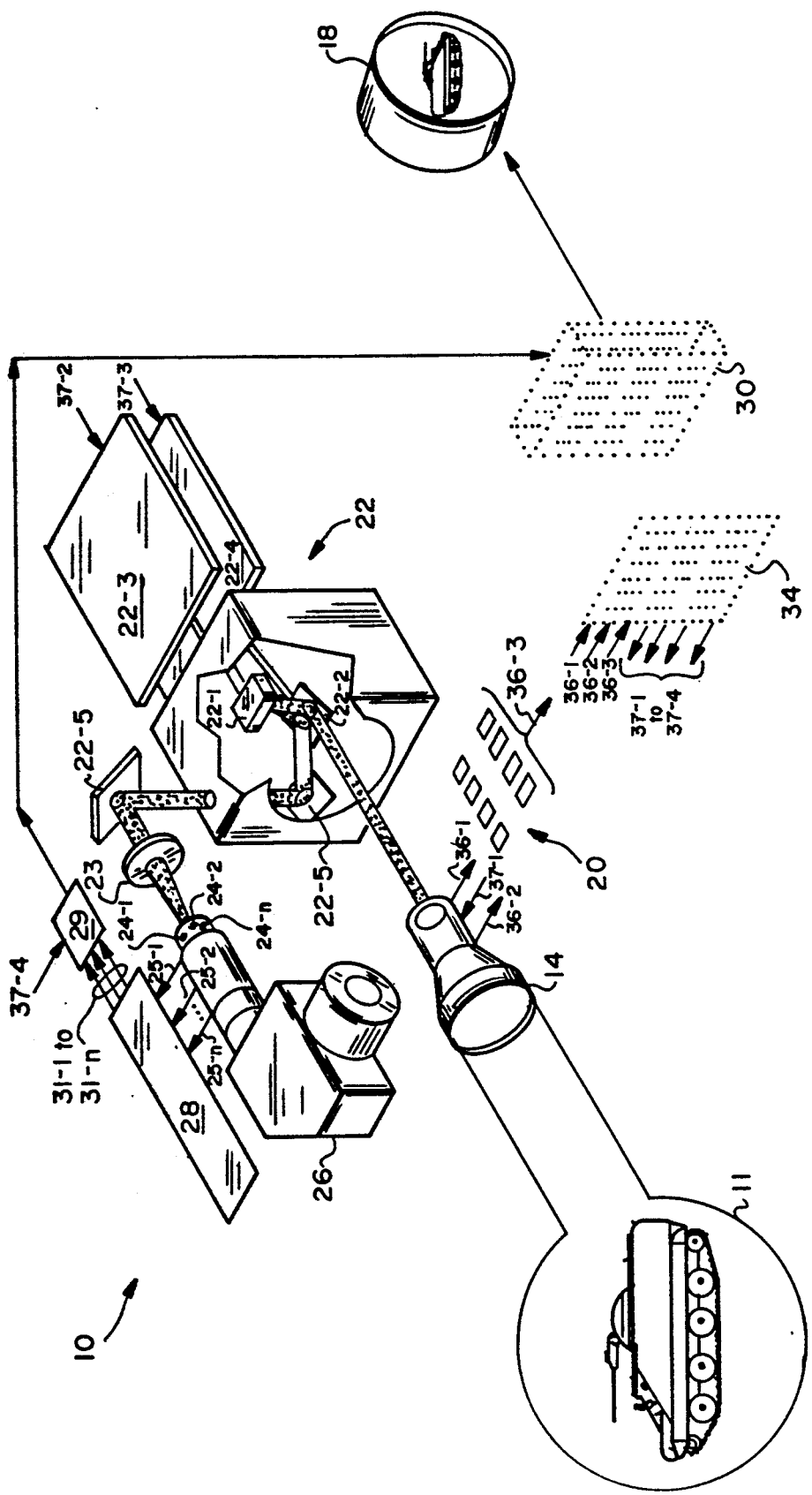
FIG. 2 is a diagrammatic view showing the various components of the imaging system.

FIG. 2 shows the mechanical configuration of the components of imaging system 10 enclosed within housing 12 in greater detail. These include the telescope 14, the display 18, and the keypad 20 as well as a two-axis scanner assembly 22, a detector lens 23, a number of detector elements 24-1, 24-2, . . . , 24-n (collectively referred to as detectors 24) mounted on a common plane, a cryogenic cooler 26, a gain and bandwidth normalization circuit 28, a signal selector 29, a signal processor 30, and a central processing unit (CPU) 34.

The telescope 14 is an afocal, fixed-magnification, variable-focus optical telescope. The telescope 14 directs radiant energy from the object scene 11 to the scanner assembly 22. The telescope 14 is also electro-mechanically focusable; that is, a focusing lens within the telescope 14 is movable via an electric motor (not shown) and its position adjusted via a focus adjust electrical signal 37-1. The focus adjust signal 37-1 is provided by the CPU 34 in response to commands received from the keypad 20. The telescope 14 also preferably include a potentiometer which provides a position feedback signal 36-1 to the CPU which indicates the physical position of the focusing lens. A temperature sensor associated with or adjacent the telescope 14 provides a temperature sense signal 36-2.

The scanner assembly 22 includes a horizontal mirror 22-1, a vertical mirror 22-2, a horizontal galvanometer control circuit 22-3, a vertical galvanometer control circuit 22-4, and folding mirrors 22-5. The instantaneous position of horizontal mirror 22-1 is controlled by the horizontal galvanometer control circuit 22-3. Similarly, the vertical galvanometer control circuit 22-4 controls the instantaneous position of the vertical mirror 22-2. The mirrors 22-1 and 22-2 are driven by the galvanometers to provide a television-like raster-scan of the radiant energy bundle provided by the telescope 14 via scanner assembly 22 to the detectors 24. The 22 is preferably constructed in accordance with the double-bounce scanning system disclosed in U.S. Pat. No. 4,347,530 previously incorporated by reference.

The vertical mirror 22-2 is preferably scanned at a constant low frequency (typically between 47 and 60 Hertz (Hz)), and the horizontal mirror 22-1 is scanned at a constant frequency, but varying amplitude, depending upon the desired maximum resolution for imaging system 10. In the preferred embodiment, the horizontal scanning rate is approximately 3,000 Hz. The horizontal and vertical limits of mirrors 22-1 and 22-2 are controlled by input signals 37-2 and 37-3 applied by the CPU 34 to circuits 22-3 and 22-4, respectively. In addition, the scanner 22 in the preferred embodiment provides a 3×2 aspect ratio, and the mechanical limits of the scanner provide a field of view of approximately 28° horizontal by 18.67° vertical.

The energy reflected from the mirrors 22-5 is directed to scanner lens 23 which focuses the bundle of radiant energy onto a focal plane of the lens 23.

The detectors 24 are all positioned in the focal plane of the lens 23. Upon receiving incident radiant energy from the lens 23 the detectors 24-1, 24-2, . . . , 24-n, provide corresponding electrical detector signals 25-1, 25-2, . . . , 25-n (collectively detector signals 25), with each electrical detector signal 25 indicating the amount of energy received by its respective detector 24. The detectors 24 are of various sizes, as dictated by the desired instantaneous field of view for various field of view settings. They are typically formed of a photoconductive material such as mercury cadmium teluride (HgCdTe).

The detectors 24 are also mounted on the cold well of the cryogenic cooler 26, to maintain their operating temperature in the cryogenic range. A preferred cryocooler is disclosed in U.S. Pat. No. 4,858,442 entitled "Miniature Integral Sterling Cryocooler", issued to Norman Stetson on Aug. 8, 1989 and assigned to the assignee of the present invention, he contents of which are hereby incorporated by reference.

The electrical signals 25 from each of the detectors 24 are in turn sent to a gain and bandwidth normalization circuit 28. As described in greater detail shortly, normalization circuit 28 provides corresponding normalized detector signals 31-1, 31-2, . . . , 31-n (collectively 31) for each of the detectors 24, which are fed to a selector circuit 29. Selector circuit 29, responsive to a field of view control signal 37-4 from the CPU 34, selects one of the n normalized detector signals 31 to be provided to the input of signal processor 30. Signal processor 30 converts the selected detector signal to one or more electrical video signals compatible with, and in the format required by, the miniature display 18.

The CPU 34 is preferably a conventional micro-controller or micro-processor. It receives the aforementioned signal 36-1 indicating the focus setting of the telescope 14 and a signal 36-3 from the keypad 20 indicating the desired field of view. It also generates other electrical control signals as described above including the control signal 37-1 to control the focus of the telescope 14; control signal 37-2 to cause the horizontal galvanometer circuit 22-3 to sweep the desired horizontal field of view; control signal 37-3 to cause vertical galvanometer circuit 22-4 to sweep the desired vertical field of view; and control signal 37-4 to cause the selector circuit 29 to select one of the normalized signals 31 to be fed to the signal processor 30.

Accordingly, with the invention, when the field of view is reduced using the keypad 20, not only are the horizontal and vertical ranges of the scanner 22 reduced by generating appropriate control signals 37-2 and 37-3 to command the galvanometer circuits 22-3 and 22-4, but also the instantaneous field of view is appropriately decreased by selecting the normalized output signal 31 from one of the smaller detectors 24.

Figure 3:
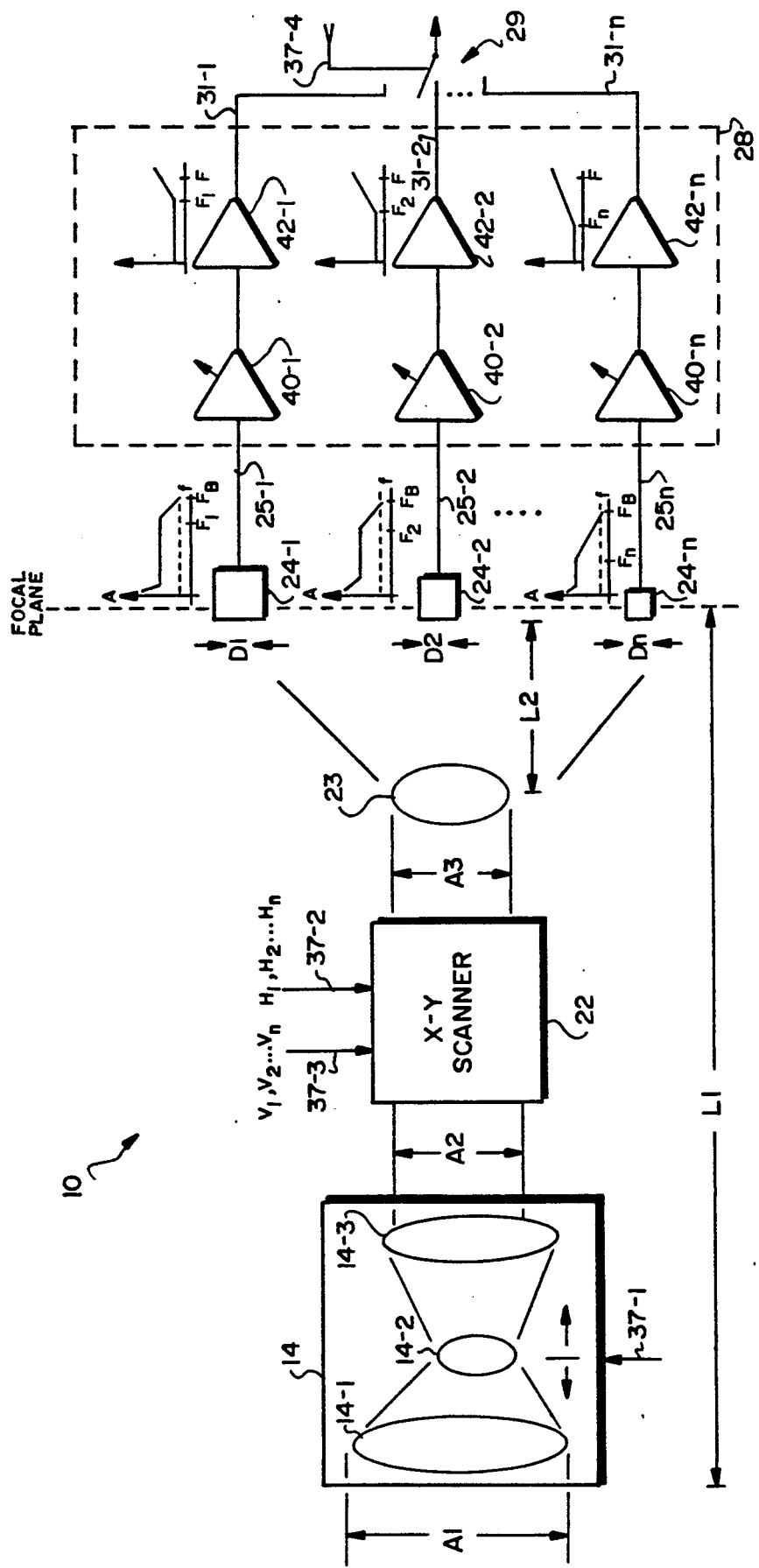
FIG. 3 is an electro-optical block diagram showing certain system components.

Refer now to FIG. 3, which shows telescope 14, scanner 22, and bandwidth normalization circuit 28 in greater detail, allowing a better understanding of how one of the detectors 24 is selected in accordance with a change in the desired field of view. The telescope 14 has an input aperture size A1 and output aperture size A2. The telescope 14 includes one or more lenses 14-1, 14-2, and 14-3 formed of a suitable material such as germanium. As previously mentioned, at least one telescope lens 14-2 can be moved relative to the other lenses, enabling the telescope to be focused. In the preferred embodiment, the system F-number is 1, so that the system focal length L1 is equal to the input aperture A1 of telescope 14. However, the system can be reconfigured easily for other F-numbers.

The scanner 22 has a pupil size A2 equal to the telescope output aperture size. The vertical and horizontal angles through which the scanner is operated are selected or changed, as previously described, by the application of suitable control signals 37-3 and 37-2, respectively, from CPU 34. The vertical control signals 37-3 comprise vertical field of view control signals v1, v2, ..., vn, and the horizontal field of view controls signals 37-2 comprise horizontal field of view control signals h1, h2, ..., hn.

The lens 23 has a clear aperture A3 equal to the pupil size of the scanner 22, i.e., A2. In the preferred embodiment with the system F-number equal to 1, the focal length L2 of lens 23 is equal to the clear aperture size A3.

The detectors 24 are each typically square in shape, with detector 24-1 having a dimension D1, detector 24-2 having a dimension D2, and detector 24-n having a dimension Dn. Other detector shapes such as rectangular, circular, oval, or diamond can also be used. An exemplary detector 24-n is associated with a particular one of the possible pairs of vertical and horizontal field of view control signals Vn and Hn, and the size of the detectors 24 is dictated by the relationship between the desired field of view and the desired resolution of the image shown by display 18.

For example, to appreciate the relative sizes of the detectors 24, consider the preferred embodiment, wherein A1 = 3 inches;
A2 = A3 = 0.65 inches; and
D1 = 1.0 millinches (mils).

If the desired system field of view is 6°, and the mechanical horizontal limit of the scanner 22 is 28°, the required telescope magnification is given by the ratio 28/6 or 4.67. The instantaneous field of view (IFOV), and thus the size of each pixel shown on the display 18 is $$IFOV = D1/A1 = 1.0 \text{ mil}/3 \text{ inches}$$
$$= 0.333 \text{ milliradians (mrads)}.$$

The system field of view of 6° corresponds to 104.7 milliradians; therefore, approximately 314 pixels are provided per horizontal scan line.

Now consider what happens if the system field of view is reduced to 3°, corresponding to 52.3 milliradians. The scanner horizontal angle is thus changed via a control signal 37-2, e.g., hn, to 14°. The fixed magnification of 4.67 from the telescope 14 remains the same. If the desired number of pixels in a horizontal scan line is to remain approximately the same, then another detector, such as detector 24-n is enabled, whose dimension Dn is one-half that of the full range detector, D1, or 0.5 mil. This results in a correspondingly smaller IFOV of $$IFOV = D2/A1 = 0.05 \text{ mil}/3 \text{ inches} = 0.167 \text{ mrads};$$

and so the same number of pixels per horizontal scan line, i.e., 314, is available regardless of the fact that the horizontal field of view has been reduced. The mathematics for the vertical field of view is analogous.

In the preferred embodiment of the invention, the change in detector size is graded. For example, a somewhat larger detector is used than is indicated by the proportional decrease in the field of view. This provides a simultaneous improvement in spatial and thermal resolution due to the resulting over-scanning. In the preferred embodiment, for example, when the field of view is reduced by a factor of 0.5, the detector size is reduced by a factor of about 0.7.

As previously explained, the detector outputs 25 are fed to the normalization circuit 28, which includes a variable gain amplifiers 40-1, 40-2, ... 40-n (collectively variable gain amplifiers 40) and an active boost circuit 42-1, 42-2, ..., 42-n (collectively boost circuits 42) for each of the detectors 24. Since a given detector, e.g., 24-1 will exhibit a different electronic gain than another detector, e.g., 24-2, the variable gain amplifiers 40 are used to normalize the gain of the detectors to a predetermined level.

Boost circuits 42 are active filter circuits which compensate for variations in cut-off frequency among the detectors 24. As shown in the temporal frequency response versus amplitude diagrams depicted adjacent the detectors 24, the cut-off frequency Fn of a detector 24-n decreases as its size decreases. Thus, if a system bandwidth Fb, is to be constant regardless of which one of the detectors 24 is presently in use, an appropriate boost circuit 42 must be associated with each detector 24 in order to "flatten-out", or normalize the frequency response between the cut-off frequency Fn and the desired system bandwidth Fb. In the preferred embodiment, the roll-off after the cut-off frequency Fn is approximately 20 decibels (dB) per decade; accordingly, the boost circuits 42 should provide a 20 dB per decade correction.

The invention also automatically provides a display which remains in focus as the field of view is changed, for any given temperature. In other words, when an object is first focused upon in a wide-angle field of view setting, and then the desired field of view is decreased in order to provide magnification of the desired object, refocusing of the system 10 is not necessary. This is a direct result of using a fixed magnification telescop 14 and having the detectors 24 all placed within the same focal plane. Since the magnification factor does not change when the field of view changes, and since the system focal length also remains the same, once the system is focused for any given field of view at a given temperature the system will remain in focus for all possible fields of view, until the temperature changes.

Recall now, as previously described in connection with FIG. 2, that the telescope 14 provides a position feedback signal 36-1 to the CPU 34 to indicates the physical position of the focusing lens. This feedback signal can be used by the CPU 34 to provide a temperature-insensitive indication of the current focal length of the system 10, and the approximate range of objects which are in focus in the display 18.

Figure 4:
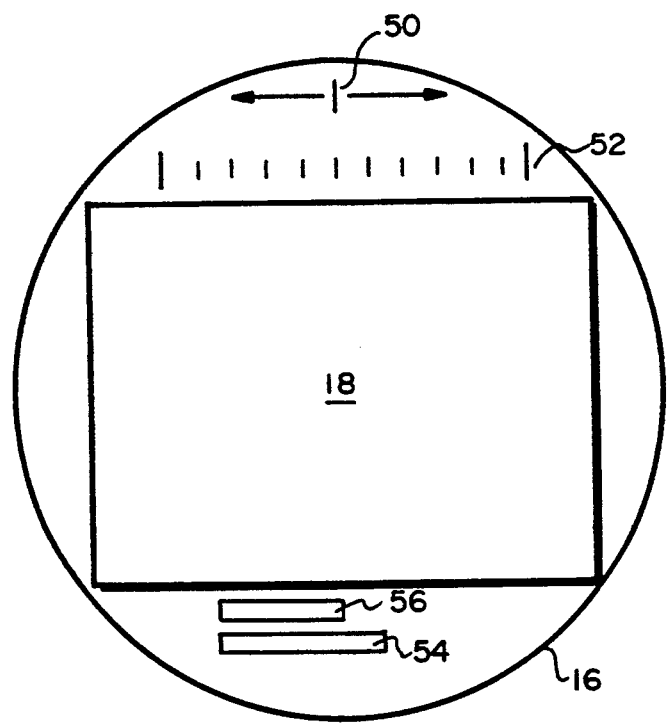
FIG. 4 is a diagrammatic view showing how the field-of-view-invariant range scale is presented.

In particular, consider FIG. 4, which is a typical view of the display 18 through the eyepiece 14. The CPU 34 provides a tick mark 50 on the display 18 which is moved to the left or the right depending upon the setting of the focus of the telescope 14 as indicated by feedback signal 36-1. In addition, the CPU 34 also provides a scale 52 on the display 18. The horizontal position of the scale 52 is moved to the left or to the right of a central position depending upon the value of the temperature sense signal 36-2 provided to the CPU 34. A temperature-insensitive representation of the approximate range of objects currently in focus is thus readily available by comparing the horizontal position of the tick 5 with the scale 52. This is accomplished without cumbersome temperature-controlled feedback servomechanisms and the like.

Other indicators such as a gain indicator 54 and level indicator 56 may also be presented on the display under appropriate commands from the CPU 34.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An imaging system comprising:
   A. a fixed magnification telescope for receiving radiant energy from an object field and providing a focused energy bundle;
   B. means for providing a field of view control signal indicating the desired field of view for the imaging system;
   C. a scanning mechanism for scanning the focused energy bundle in two dimensions, the scanning mechanism successively focusing elemental areas of the object field onto a scanner focal plane, and the scanner field of view being selectably changeable in accordance with changes in the field of view control signal;
   D. a plurality of radiant energy detectors, the radiant energy detectors disposed in the scanner focal plane and being of various sizes determined by a like plurality of desired instantaneous field of view settings for the imaging system, and each detector providing a detector signal corresponding to the amount of radiant energy incident thereon; and
   E. means for selecting one of the detector signals as a displayed signal according to the field of view control signal, and thereby to simultaneous adjust the instantaneous field of view of the imaging system in response to changes in the field of view control signal.

2. An imaging system as in claim 1 wherein each detector is associated with a particular desired field of view.

3. An imaging system as in claim 1 additionally comprising:
   H. a plurality of bandwidth normalization circuits, with a bandwidth normalization circuit associated with each of the detectors, the bandwidth normalization circuits for normalizing the bandwidth of detector signals output by the detectors so that the detector signals all exhibit the same bandwidth.

4. An imaging system as in claim 1 wherein the fixed magnification telescope includes a focusing lens, and the telescope also provides a position feedback signal indicating the relative position of the focusing lens, and a temperature signal indicating the ambient temperature of the telescope, the system additionally comprising:
   I. means for providing a temperature-invariant indication of the current focal range of the imaging system, by adjusting a focal indicator in accordance with changes in the position feedback signal, and adjusting a focal scale indicator in accordance with the temperature signal.

* * * * *